M. DERIHON.
SHOCK ABSORBER FOR VEHICLES.
APPLICATION FILED AUG. 8, 1912.

1,183,281.

Patented May 16, 1916.

UNITED STATES PATENT OFFICE.

MARTIN DERIHON, OF LONCIN-LEZ-LIEGE, BELGIUM.

SHOCK-ABSORBER FOR VEHICLES.

1,183,281. Specification of Letters Patent. Patented May 16, 1916.

Application filed August 8, 1912. Serial No. 714,073.

*To all whom it may concern:*

Be it known that I, MARTIN DERIHON, subject of the King of Belgium, residing at Loncin-lez-Liege, Belgium, have invented certain new and useful Improvements in Shock-Absorbers for Vehicles, of which the following is a specification.

The present invention has for its object to provide an improved shock absorber for motor-cars and other suspended vehicles, so as to allow the suspension springs to be freely compressed or deflected, but retard the return movement which follows this compression or deflection of the spring. This retarding effect is, according to the present invention, of a constant value in both directions, whatever may be the amplitudes of vibration of the suspension springs. This result is obtained by means of a device which is arranged so as to have no effect on the resilient deflection of the spring, that is to say, on the relative displacements which take place between the spring and the vehicle frame in both directions away from the neutral position, but to restrain the rapidity of the return movements toward the relative neutral position of the frame and spring with a constant resistance, that is to say, whatever may be the position of the piston of the device.

The accompanying drawings represent a shock absorber constructed according to this principle.

Figure 1:
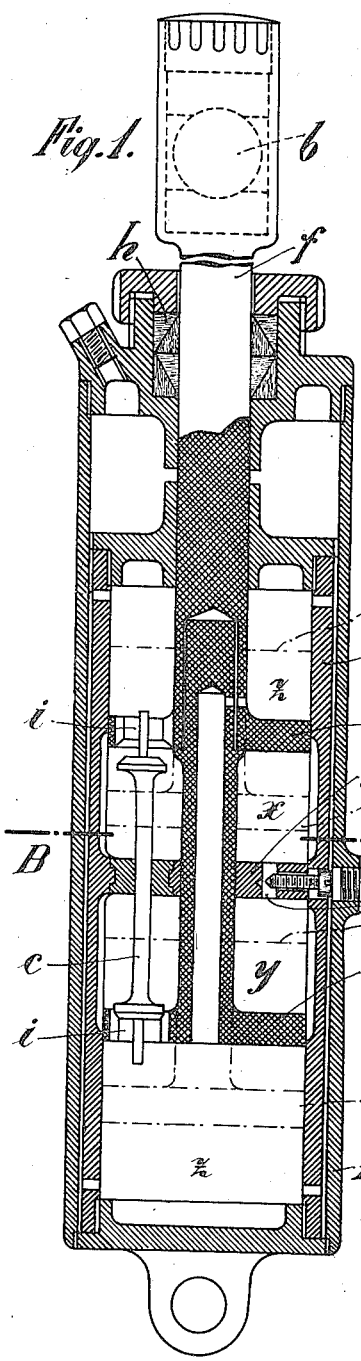
Figure 2:
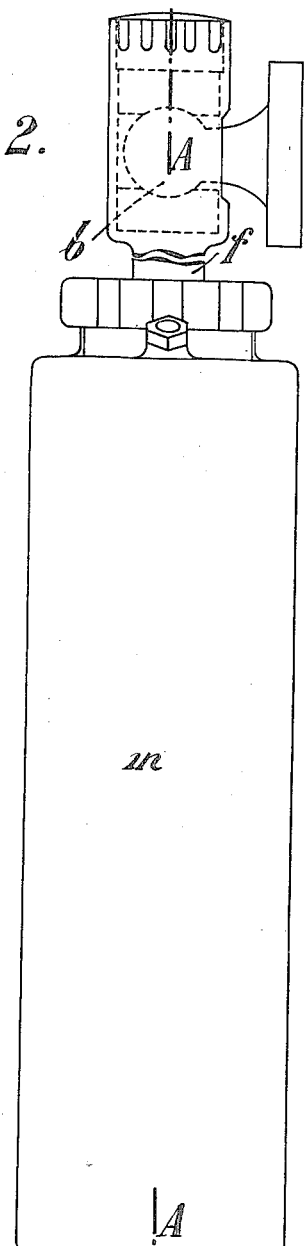
Figure 3:
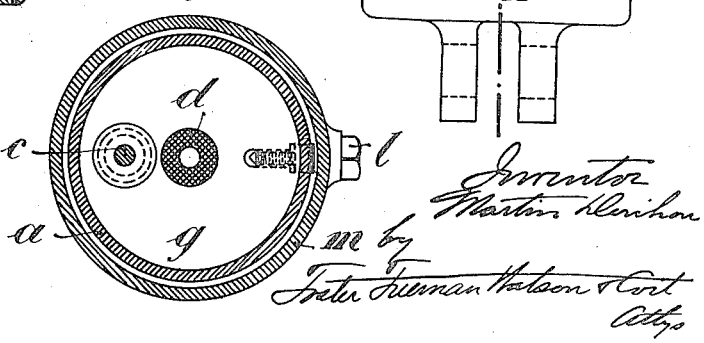

Figure 1 is a longitudinal section on A—A (Fig. 2) through the improved shock absorber. Fig. 2 is an exterior view. Fig. 3 is a transverse section on B—B (Fig. 1).

The appliance comprises a cylinder $a$ divided at its middle by a transverse partition $g$. A double piston $e$—$d$ moves in the cylinder $a$ and through the division $g$, being connected by a rod $f$ to the vehicle frame, by means of an intermediate ball-joint $b$. The cylinder $a$ is fixed to the axle by means of a hinge-joint at its lower end. Each of the pistons $e$ and $d$ is formed with an opening $i$, the said openings being alternately closed by a double valve $c$ guided in the division $g$. An outer casing $m$ is carried by the lower end cover of the cylinder $a$, and carries at its upper end a stuffing-box $h$, through which passes the rod $f$, and which incloses the whole of the mechanism.

The compartments or chambers $x$ and $y$ communicate with one another by means of a passage $k$, which may be regulated by means of a screw $l$; the end compartments $z$ of the cylinder $a$ communicate with one another by means of an annular space formed between the casing $m$ and the cylinder $a$ and by the rod $f$ which is partly hollow. The whole of the appliance is filled with oil.

From the division $g$ to a point corresponding to the normal position of the pistons $e$ and $d$, the cylinder $a$ is formed of a larger diameter than it is beyond the said normal position; it is also formed of larger diameter than the two pistons.

If the piston $e$—$d$ occupies the normal position shown in Fig. 1, and the spring is compressed, and its ends deflected downward, the piston $e$—$d$ descends to the position $e^1$, $d^1$, the upper piston $e$, on leaving its normal position, entering a chamber of a larger diameter, so that the oil passes from the chamber $x$ to the chamber $z$ above it; the lower cylinder $d$, however, enters a chamber of an equal diameter but the valve $c$, on account of the friction offered to its movement in the division $g$, opens the port $i$ in the piston $d$ and allows a free passage of the oil from the lower chamber $z$ to the chamber $y$. Oil may also pass from one chamber $z$ to the other through the tubular piston rod and the space separating the cylinders $a$, $m$. It will be seen that the two chambers $z$ are in constant communication and that no compression of oil occurs therein when the device is in use. The spring is therefore freely deflected. In returning, the double piston $e$—$d$ is raised in the cylinder; the upper piston meets with no resistance, as the oil can freely pass from the upper chamber $z$ to the chamber $x$; on the other hand, the opening $i$ of the piston $d$ is closed so that the oil is confined in the chamber $y$, so that, owing to there being no free passage, the oil is forced through the adjustable opening $k$. The double piston $e$—$d$ is thus retarded until it reaches its normal position. The inverse effect is produced when the piston continues to rise in the cylinder, that is to say, when the suspension spring is relaxed or deflected in the opposite direction, and the said piston takes the position $e^2$, $d^2$. It will be seen that this movement takes place freely, as in the preceding case, while the return of the piston to its normal position will be retarded, the oil traversing the passage $k$ in order to pass from the compartment $x$ to the compartment $y$.

Having fully described my invention, what

I desire to claim and secure by Letters Patent is:—

1. A shock absorber comprising, in combination a cylinder containing oil, a partition in the cylinder having an adjustable passage, a double piston movable in the cylinder and in the partition and having an opening in each part, and a double valve, guided in the partition, and adapted to close the openings in the piston; that part of the cylinder comprised between the two parts of the piston when they occupy their normal position, being bored to a greater diameter than the said piston.

2. In a shock absorber, the combination with a casing adapted to be filled with oil and having its interior divided by a transverse partition into two communicating chambers, two pistons arranged on opposite sides of the partition, a valve controlling an opening in each piston and adapted to permit oil to pass freely therethrough in one direction only, said valves being alternately opened automatically, means providing a passage of constant dimensions connecting the chambers formed between the pistons and ends of the casing, and adjustable means for controlling the passage of oil from one of the chambers between the pistons and partition to the other.

3. In a shock absorber, the combination with a casing adapted to be filled with oil and having its interior divided by a transverse partition into two chambers which communicate through an opening or passage in the partition, pistons arranged on opposite sides of the partition, valves each controlling an opening in one of the pistons and adapted to permit oil to pass freely therethrough in one direction only, means providing a passage of constant dimensions connecting the chambers formed between the pistons and the ends of the casing, and adjustable means for controlling the passage of oil through the passage in the partition.

In testimony whereof I have hereunto set my hand in presence of two subscribing witnesses.

MARTIN DERIHON.

Witnesses:
A. P. Cruger,
Boutay.

Copies of this patent may be obtained for five cents each, by addressing the "Commissioner of Patents, Washington, D. C."